(12) United States Patent
Scafaria (10) Patent No.: US 12,002,113 B2
(45) Date of Patent: Jun. 4, 2024

(54) METHOD, APPARATUS, AND COMPUTER-READABLE MEDIUM FOR LEVERAGING DATA

(71) Applicant: DotAlign, Inc., New York, NY (US)

(72) Inventor: Vince Scafaria, Colts Neck, NJ (US)

(73) Assignee: DotAlign, Inc., New York, NY (US)

( * ) Notice: Subject to any disclaimer, the term of this patent is extended or adjusted under 35 U.S.C. 154(b) by 115 days.

(21) Appl. No.: 15/487,873

(22) Filed: Apr. 14, 2017

(65) Prior Publication Data
US 2017/0301040 A1    Oct. 19, 2017

Related U.S. Application Data

(60) Provisional application No. 62/322,534, filed on Apr. 14, 2016.

(51) Int. Cl.
| | |
|---|---|
| *G06Q 10/00* | (2023.01) |
| *G06Q 50/00* | (2012.01) |
| *H04L 67/14* | (2022.01) |
| *H04L 69/14* | (2022.01) |
| *G06Q 10/1053* | (2023.01) |
| *G06Q 10/1093* | (2023.01) |

(52) U.S. Cl.
CPC ............ *G06Q 50/01* (2013.01); *H04L 67/14* (2013.01); *H04L 69/14* (2013.01); *G06Q 10/1053* (2013.01); *G06Q 10/1095* (2013.01)

(58) Field of Classification Search
CPC ............... G06Q 50/01; G06Q 10/1095; G06Q 10/1053; G06Q 10/063112; G06Q 50/20; G06Q 10/103; G06Q 10/105; H04L 67/14; H04L 69/14; G06F 16/9535; G06F 16/24578
See application file for complete search history.

(56) References Cited

U.S. PATENT DOCUMENTS

| | | |
|---|---|---|
| 7,818,392 B1 | 10/2010 | Martino et al. |
| 7,849,103 B2 | 12/2010 | Hyatt et al. |
| 7,890,871 B2 | 2/2011 | Etkin |
| 8,010,619 B1 | 8/2011 | Lawler et al. |
| 8,135,800 B1 | 3/2012 | Walsh et al. |

(Continued)

FOREIGN PATENT DOCUMENTS

WO     2015000138 A1     1/2015

OTHER PUBLICATIONS

Wu: "Detecting Professional versus Personal Closeness Using an Enterprise Social Network Site" CHI 2010: Tools Affecting the Enterprise (Apr. 10-15, 2010).

(Continued)

*Primary Examiner* — Gabrielle A McCormick
(74) *Attorney, Agent, or Firm* — Timothy W. Menasco, Esq.; Harter Secrest & Emery LLP (57) ABSTRACT

Exemplary embodiments of the present disclosure provide a method, apparatus, and computer-readable medium for sharing. An exemplary method includes receiving, by a user equipment (UE) having a plurality of connections, a description, and determining, by the UE, a correspondence between the description and the plurality of connections. The method further includes providing, by the UE, an option to share a subset of the plurality of connections that have a correspondence above a predetermined threshold.

13 Claims, 6 Drawing Sheets

402: (a) receiving, by a user equipment (UE) having a plurality of connections, a description; (b) determining, by the UE, a correspondence between the description and the plurality of connections; and (c) providing, by the UE, an option to share a subset of the plurality of connections that have a correspondence above a predetermined threshold.

404: wherein the description is a job posting, introduction request, or opportunity.

406: wherein the plurality of connections is based on at least one of a list of contacts, social network connections, telephone calls, text messages, calendar appointments, and emails maintained on and accessible by the UE.

408: wherein the determining includes ranking the plurality of connections based on at least one of a similarity to the description and a connectedness to the plurality of connections.

410: wherein the UE is unaware of a source of the description

412: wherein the UE does not release any portion of the plurality of connections to a source of the description prior to providing the option 414: wherein the connectedness is based on an importance, job seniority, and relationship-strength of the connection (56) References Cited

U.S. PATENT DOCUMENTS

| | | | |
|---|---|---|---|
| 8,306,922 B1 | 11/2012 | Kunal et al. | |
| 8,494,992 B1* | 7/2013 | Westbrook | G06F 16/9535 |
| | | | 706/45 |
| 8,499,247 B2 | 7/2013 | Niyogi et al. | |
| 8,943,047 B1 | 1/2015 | Carpio et al. | |
| 8,977,573 B2 | 3/2015 | Daya et al. | |
| 9,152,734 B2 | 10/2015 | Rinearson et al. | |
| 9,171,338 B2 | 10/2015 | Chrapko et al. | |
| 9,195,996 B1 | 11/2015 | Walsh et al. | |
| 2006/0048059 A1* | 3/2006 | Etkin | G06K 9/00677 |
| | | | 715/745 |
| 2009/0144377 A1 | 6/2009 | Kim et al. | |
| 2009/0271374 A1 | 10/2009 | Korn et al. | |
| 2010/0030638 A1 | 2/2010 | Davis, III et al. | |
| 2011/0276505 A1* | 11/2011 | Schmitt | G06Q 50/01 |
| | | | 705/321 |
| 2012/0303714 A1 | 11/2012 | Chung et al. | |
| 2013/0018960 A1* | 1/2013 | Knysz | G06Q 50/01 |
| | | | 709/204 |
| 2014/0136434 A1* | 5/2014 | Posse | G06Q 50/01 |
| | | | 705/319 |
| 2014/0278816 A1 | 9/2014 | Sharp et al. | |
| 2015/0127565 A1* | 5/2015 | Chevalier | G06Q 30/00 |
| | | | 705/319 |
| 2015/0220885 A1 | 8/2015 | Cohen | |
| 2015/0227892 A1 | 8/2015 | Goel et al. | |
| 2015/0331567 A1 | 11/2015 | Crooks | |
| 2016/0063442 A1 | 3/2016 | Bennett et al. | |
| 2016/0092571 A1 | 3/2016 | Pattabiraman et al. | |
| 2016/0140789 A1* | 5/2016 | Wickersham, III | |
| | | | H04L 12/1827 |
| | | | 705/12 |
| 2016/0205057 A1* | 7/2016 | Wang | G06Q 10/10 |
| | | | 709/206 |

OTHER PUBLICATIONS

Gilbert et al.: "Predicting Tie Strength With Social Media" CHI 2009, Apr. 4-9, 2009.
International Search Report and Written Opinion from corresponding PCT/US17/27704, dated Jun. 9, 2017 (9 pages).
Supplementary European Search Report from corresponding European Application No. 17783278.9, dated Aug. 2, 2018 (11 pages).

* cited by examiner

402: (a) receiving, by a user equipment (UE) having a plurality of connections, a description; (b) determining, by the UE, a correspondence between the description and the plurality of connections; and (c) providing, by the UE, an option to share a subset of the plurality of connections that have a correspondence above a predetermined threshold.

404: wherein the description is a job posting, introduction request, or opportunity.

406: wherein the plurality of connections is based on at least one of a list of contacts, social network connections, telephone calls, text messages, calendar appointments, and emails maintained on and accessible by the UE.

408: wherein the determining includes ranking the plurality of connections based on at least one of a similarity to the description and a connectedness to the plurality of connections.

410: wherein the UE is unaware of a source of the description

412: wherein the UE does not release any portion of the plurality of connections to a source of the description prior to providing the option

414: wherein the connectedness is based on an importance, job seniority, and relationship-strength of the connection

METHOD, APPARATUS, AND COMPUTER-READABLE MEDIUM FOR LEVERAGING DATA

BACKGROUND OF THE INVENTION

Field of the Invention

Exemplary embodiments of the present disclosure relate to a method, apparatus, and computer-readable medium for leveraging data. Exemplary embodiments of the present disclosure relate more particularly to leveraging connection data of a user.

Description of Related Art

A social network service is a platform to build social networks or social relations among people who share similar interests, activities, backgrounds, or real-life connections. There are a variety of stand-alone and built-in social networking services currently available in the online space. Some common features of social networking services include (1) social networking services that are Web 2.0 internet-based applications, (2) user-generated content, (3) user created service-specific profiles for a given site or app that are designed and maintained by the social networking site, and (4) social networking services that facilitate the development of online social networks by connecting a user's profile with those other individuals and/or groups.

Most social network services are web-based and provide means for users to interact over the internet, such as e-mail and instant messaging. Social network sites are varied and they incorporate new information and communication tools such as mobile connectivity, photo/video/sharing and blogging. Online community services are sometimes considered a social network service, though in a broader sense, social network service usually means an individual-centered service whereas online community services are group-centered. Social networking sites allow users to share ideas, pictures, posts, activities, events, and interests with people in their network.

SUMMARY OF THE INVENTION

In view of the foregoing, it is an object of the present disclosure to provide a method, apparatus, and computer-readable medium for leveraging data.

A first exemplary embodiment of the present disclosure provides a method for leveraging data. The method includes receiving, by a user equipment (UE) having a plurality of connections, a description, and determining, by the UE, a correspondence between the description and the plurality of connections. The method further includes providing, by the UE, an option to share a subset of the plurality of connections that have a correspondence above a predetermined threshold.

A second exemplary embodiment of the present disclosure provides an apparatus for leveraging data. The apparatus includes at least one processor and a memory storing computer program instructions executable by the at least one processor, wherein the memory with the computer program instructions and the processor are configured to cause the apparatus to at least receive a description, the apparatus having a plurality of connections, and determine a correspondence between the description and the plurality of connections. The at least one processor and memory storing computer program instructions are further configured to cause the apparatus to provide an option to share a subset of the plurality of connections that have a correspondence above a predetermined threshold.

A third exemplary embodiment of the present disclosure provides a computer-readable medium tangibly storing computer program instructions which when executed by a processor, cause the processor to at least receive a description, the apparatus having a plurality of connections, and determine a correspondence between the description and the plurality of connections. The computer-readable medium tangibly storing computer program instructions with the processor further cause the processor to provide an option to share a subset of the plurality of connections that have a correspondence above a predetermined threshold.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

DETAILED DESCRIPTION OF THE INVENTION

Both individuals and businesses have connections with other individuals and businesses. These connections include information stored on a user equipment (UE), such as phones (or smartphones) via contact lists, phone records, text messages, emails, SMS, and contact histories, on computer directories via email contact lists, or through social networking websites. Customer relationship management (CRM) systems typically require users to share their connections freely such that other users can browse or search the connections to find useful contacts. This has the pitfall of requiring users to give away access to their connections to others that they would prefer did not have access. Accordingly, there is a need to better utilize these resources to leverage either an individual's connections or a business's connections to help facilitate other connections without the requirement to share all or even a subset of one's connections to all users.

Exemplary embodiments of the present disclosure provide a method, apparatus, and computer-readable medium for determining whether a description has a correspondence to a data or a plurality of data, and then provides the correspondence (if it exists) to the user or owner of the data along with an option to connect with a source of the description. In other words, embodiments of the present disclosure provide a method, apparatus, and computer-readable medium for determining whether a user's connections (people or companies with whom the user has a relationship based on data derived from e.g., telephone contacts, facebook friends, linkedin connections, calendar meetings/lunches, emails, text messages, telephone calls) meet the criteria of a description (e.g., job posting, job description, introduction request, qualification). Embodiments of the present disclosure further provide that a user's data be exclusively maintained within a UE or other device/location, and that the user not share its data with anyone whether it be another user, service, business, website, or network to determine whether a correspondence exists. In other words, embodiments of the present disclosure allow a user to leverage or use their connections to meet or fill another user's need or description without that user having to disclose or share any or all of their connections with other users.

Figure 1:
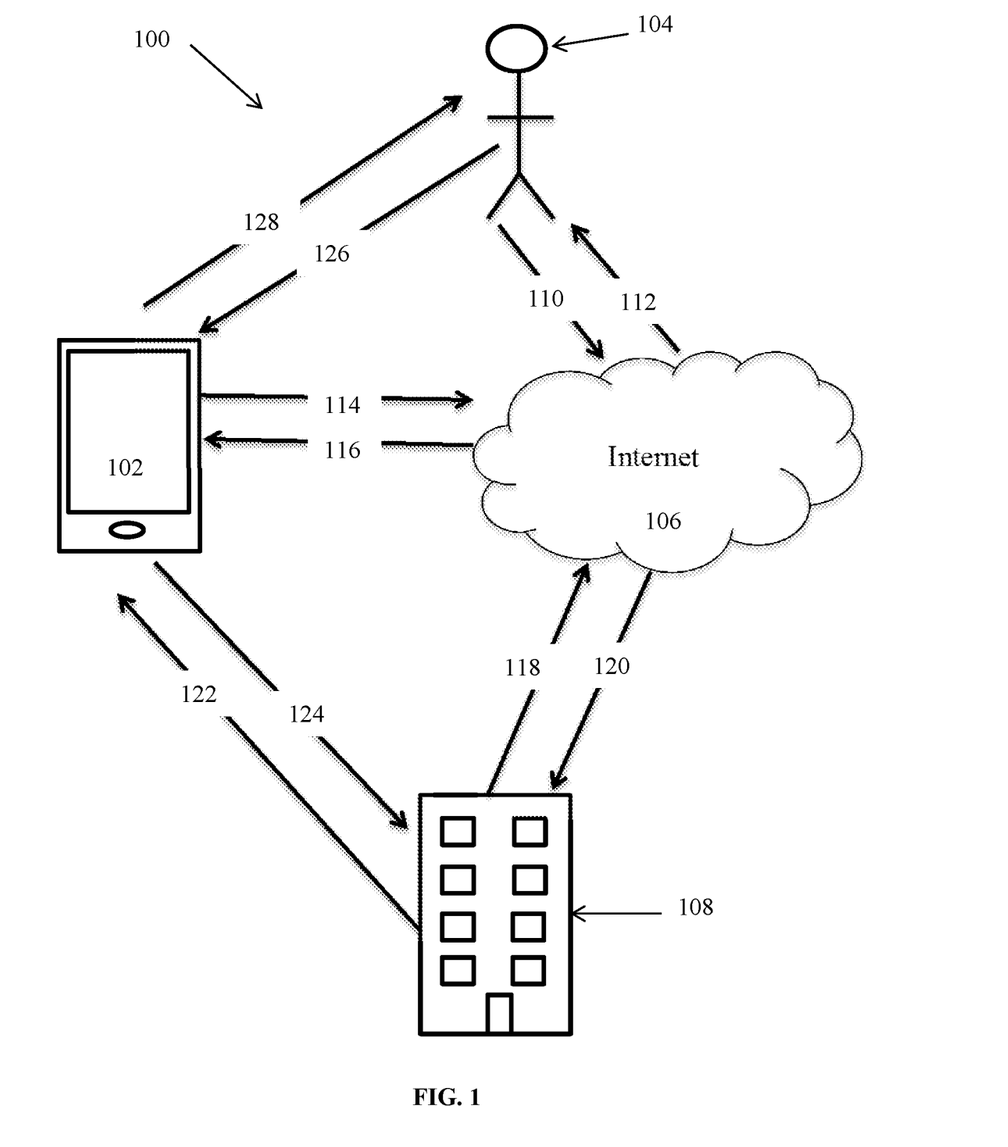
FIG. 1 presents a simplified signaling diagram between devices suitable for use in practicing exemplary embodiments of this disclosure.

Referring the FIG. 1, shown is a simplified signaling diagram between devices suitable for use in practicing exemplary embodiments of this disclosure. Shown in FIG. 1 is system 100 which includes UE 102, publisher 104, internet 106, and business 108. Embodiments of UE 102 include a processor, an input/out interface such as a display, a memory, a transmitter for transmitting data, and a receiver for receiving data. Exemplary embodiments of UE 102 include smartphones, tablets, cellphones, laptops, desktops, PCs, wearable devices, and portable electronic devices. Exemplary embodiments of UE 102 are operable to maintain a data such as a user's contact lists, friends lists, business connections, social network contacts, and the like. Embodiments of UE 102 in some instances are operable to access a user's contact lists, friends lists, business connections, social network contacts, and the like, which are maintained on a web server or other separate server or device. UE 102 is operable to transmit data to the internet 106 via line 114, and receive data from the internet via line 116. UE 102 is operable to transmit data directly to publisher 104 via line 128 and receive data directly from publisher via line 126. UE 102 is operable to transmit data directly to business 108 via line 124, and receive data directly from business 108 via line 122.

Publisher 104 includes any person or entity separate from business 108 that includes a UE or other device that is operable to transmit data to the internet 106 via line 110 and receive data from the internet 106 via line 112. Embodiments of publisher 104 include any person that works with or for a company that is looking for people that fit a particular demographic or have a particular set of skills or qualifications. For instance, publisher 104 can be a job recruiter or headhunter looking for someone with specific skills that would be able to perform a certain job. Publisher 104 is operable to transmit via line 110 to internet 106 a data such as a description of a job. For the purposes of this disclosure, internet 106 can include the internet, a web server, a network share drive, a file server, a local server, and a smart server. It should be appreciated that embodiments of a smart server include a server that is operable to perform operations in response to an application on the data it maintains and make a determination of the parties who have access to such data. Conversely, embodiments of a file server include a server that is only able to maintain data, but is unable to examine or make determinations about the data it maintains and the parties who have access to such data.

Business 108 includes any type of company or business, which would typically have a UE or one or multiple devices or computers that are operable to transmit data to the internet 106 via line 118, and receive data from the Internet 106 via line 120. Business 108 includes any company or business that is looking for people that fit a particular demographic or have a particular set of skills or qualifications. Business 108 is operable to transmit via line 118 data such as a description of a job.

In practice, an exemplary process shown in system 100 begins with a posting (or description) being created and sent to the Internet 106 from either publisher 104 or business 108. The description can include a typical human-readable online posting, but can also include machine-readable postings, or simply a description of an ideal candidate. For instance, the description can state that publisher 104 or business 108 is currently looking to fill a certain job and is for example looking for a computer programmer with 4-6 years of experience with a bachelor of science in computer engineering and is able to code proficiently in Python. In another instance, the description can be a request to connect with a specifically named individual, or an employee of a specific company who meets certain criteria, such as job qualifications.

The description is received by UE 102 via line 116 from Internet 106. UE 102 then determines whether there is a correspondence between the description and any of the connections on the UE 102. Correspondence can include matching a connection of the user of UE 102 with a connection who has qualifications that match the description. For instance, UE 102 may determine that the user has a connection that closely matches the description because one of the user's connections named John Smith has been a computer programmer for 7 years and is fluent in Python. The determining includes assigning a number or ranking to each of the connections based on whether the connection meets the criteria of the description, and also based on how well the user of UE 102 knows/interacts with the connection. The determined number or ranking can also be based on how important the publisher 104 or business 108 is for the user of UE 102. For instance, if John Smith has corporate seniority over the user, or is associated with multiple recent calendar lunches or telephone calls will obtain a higher ranking than a connection that has no recent activity with the user. UE 102 will then provide/display the connections or an indication of the existence and/or strength of the connection to the user that correspond to the description with a ranking/number above a predetermined threshold. UE 102 will also give the user of UE 102 an option to share the corresponding connections with the source of the description (i.e., publisher 104 or business 108) or an option to contact the source of the description in order to connect the user's connection with the source of the description. During this process, unless decided by the user, all of the user's connections are maintained exclusively on UE 102 and no information, connections, or data is released from UE 102 prior to the option to share. The user of UE 102 is not required to share any information or connections beyond the domain of UE 102. Further, no access to UE 102 data is provided or granted to anyone other than the user.

If the user of UE 102 decides to share the connections with a correspondence with publisher 104 or business 108, UE 102 can communicate directly with publisher 104 via lines 126 and 128 or indirectly through Internet 106. UE 102 is operable to communicate directly or indirectly with publisher 104 or business 108 either anonymously or not. UE 102 can also use lines 122 and 124 to communicate directly with business 108 or indirectly through Internet 106. For the purposes of this disclosure, all communication lines (110, 112, 114, 116, 118, 120, 122, 124) include wired and wireless communication.

A user can offer to share to corresponding connections with the publisher 104 either freely or in exchange for consideration. In one embodiment, publisher 104 and business 108 transmits funds or money to user of UE 102 in return for UE 102 opting to share the connections of the user of UE 102 that correspond to the description. It should be appreciated that embodiments of the above processes can be performed locally by an application running on UE 102 or an application running through internet 106 that UE 102 is operable to access. Other than the decision of sharing connections and communicating, embodiments of the presented processes can be performed automatically or independent of user action. It should be further appreciated that the above processes can be performed with or without the use of a smart server. For instance, UE 102 could receive the description from a smart server that is operable to search for encrypted or unencrypted postings (or descriptions) from an email or other message. In another instance, the descriptions are posted to a server or smart server that is exclusively used by an application running on UE 102. The application running on UE 102 pulls, accesses, or receives the description from internet 106 and/or the server or smart server. In this embodiment, the description is not publically available.

In yet another embodiment UE 102 is only able to pull, access, or receive the description provided that the user of UE 102 meets certain criteria. For example, the user of UE 102 may only be able to access the description if the user has made/shared connections previously (i.e., has a high enough relationship score), is a broker-dealer, recruiter, accredited investor, or in-house colleague.

In yet another embodiment, a connection that matches the description along with a number or ranking associated with the connection(s) is sent to a server, file server, or smart server wherein the ranking is compared to the ranking associated with other user's connections. The server will then determine based on the rankings, which connection or connections should be shared or allowed to be shared with the entity that posted the need or description. For the case that the server is a file server, the file server will receive the ranking associated with other user's connections and then allow each UE to retrieve all of the other user's rankings (in one embodiment without the associated connections). Each individual UE will then determine based on the rankings whether that particular user should receive a prompt to respond to the need or description because that user's connections ranked above a certain threshold relative to the other ranked connections.

For instance, publisher 104 may post a description to a server on Internet 106. Business 108 and UE 102 both have connections that match the description and both send their connections with associated rankings to a server on Internet 106. The server will determine (based on the rankings), which connections from business 108 and UE 102 could be shared with publisher 104 because they ranked above a certain threshold. For instance, the server may determine that the top three ranked connections ranked high enough in comparison to other connections such that they warrant the option to be shared. Two of connections from business 108 and one connection from UE 102 are in the top three ranked connections. Accordingly, UE 102 and business 108 will then be given or prompted with an option to share the corresponding connections with the source of the description or an option to contact the source of the description in order to connect the user's connection with the source of the description. Thus, embodiments of the present disclosure provide that an intermediary device (e.g., a server, device, smart server or application) can determine which connections and how many connections can be prompted or allowed to be shared with the source of a description.

In this embodiment, the intermediary device can either (1) receive both the specific connections and the associated rankings or (2) receive only the ranking and an anonymous connection. In this regard, there is no need to share a user's connections before being given the option to connect with the source of a description even when a specific user's connections are being compared to other user's connections for the purposes of providing the connections that fit the description the best.

Figure 2:
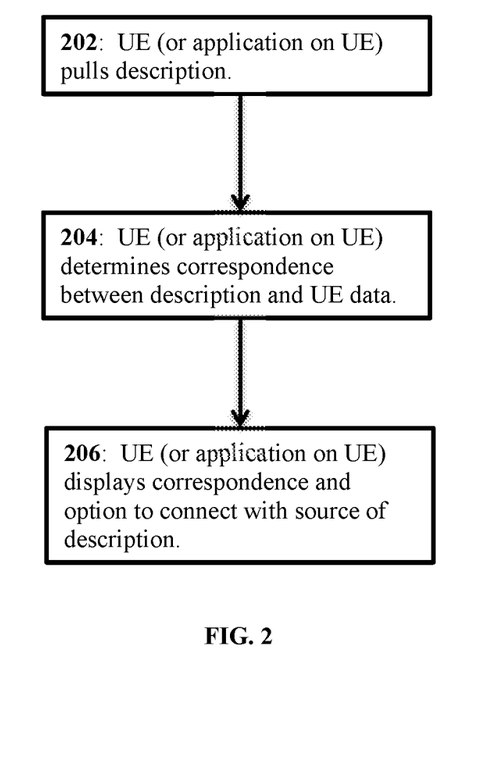
FIG. 2 presents a simplified logic flow diagram in accordance with a method, apparatus, and computer-readable medium for performing exemplary embodiments of this disclosure.

Reference is now made to FIG. 2, which illustrates a simplified logic flow diagram in accordance with a method, apparatus, and computer-readable medium for performing exemplary embodiments of this disclosure. An exemplary process begins at block 202 wherein a UE pulls description information or data. The information or data can be pulled from the internet, a local server, a private server, or a combination of each of these. In one instance, an application running on the UE can cause the UE to pull the description. Next at block 204, the UE will determine whether there is a correspondence between the description and data on the UE. The UE can also rank or set a score to each correspondence data based on the correspondence with the description.

The UE at block 206 then displays the data (or connections) that correspond to the description above a certain threshold. In other words, UE will display the data that has a ranking or score above a certain number that corresponds to the description. The UE will then provide an option to the user of UE to connect with source of the description as well as an option to share the connections.

Figure 3:
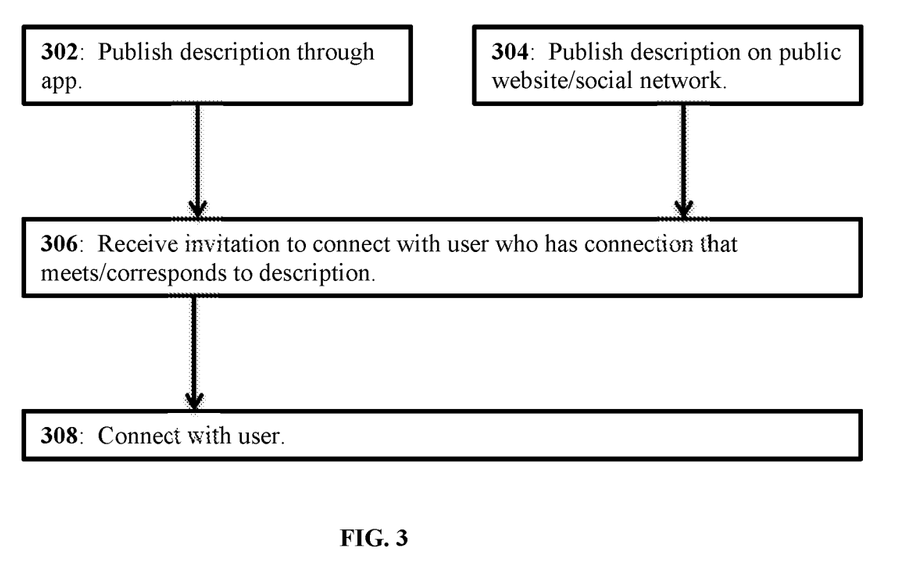
FIG. 3 presents an alternative logic flow diagram in accordance with a method, apparatus, and computer-readable medium for performing exemplary embodiments of this disclosure.

Referring to FIG. 3, shown is an alternative logic flow diagram in accordance with a method, apparatus, and computer-readable medium for performing exemplary embodiments of this disclosure. The process illustrated in FIG. 3 begins at block 302 wherein an individual, publisher or business posts or publishes a description through an application (app). Alternatively, at block 304, an individual, publisher or business posts or publishes a description on a public website/social network. Then at block 306 the individual or business receives an invitation to connect with a user who has a connection that meets/corresponds to the published description. Then at block 308 the individual or business connects with the user. Connection with the user may include the transfer of money or funds as well as the ability to communicate.

Figure 4:
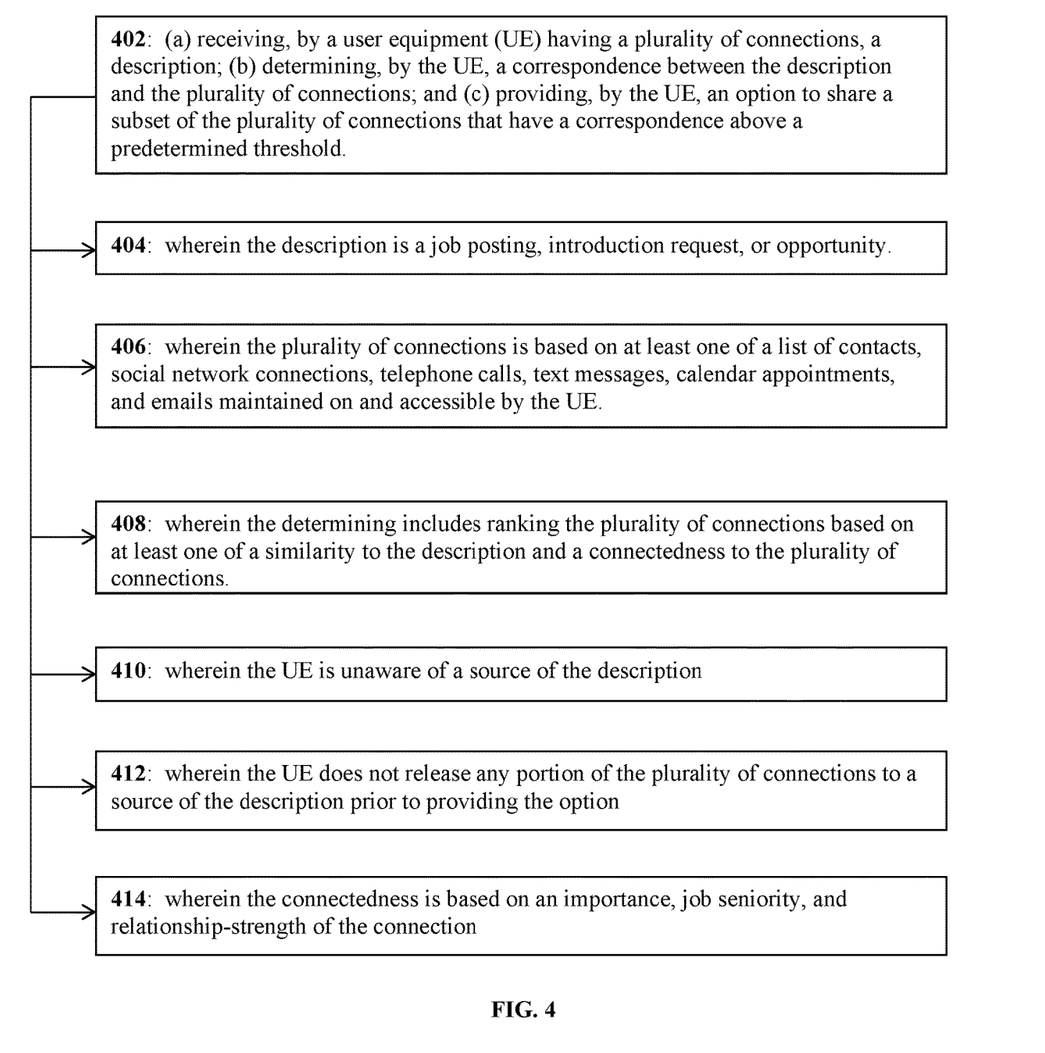
FIG. 4 presents a logic flow diagram in accordance with a method, apparatus, and computer-readable medium for performing exemplary embodiments of this disclosure.

FIG. 4 presents a summary of the above teachings for leveraging data. Block 402 presents (a) receiving, by a user equipment (UE) having a plurality of connections, a description; (b) determining, by the UE, a correspondence between the description and the plurality of connections; and (c) providing, by the UE, an option to share a subset of the plurality of connections that have a correspondence above a predetermined threshold. Then block 404 specifies wherein the description is at least one of a job posting, introduction request, or opportunity.

Some of the non-limiting implementations detailed above are also summarized at FIG. 4 following block 404. Block 406 relates to wherein the plurality of connections is based on at least one of a list of contacts, social network connections, telephone calls, text messages, calendar appointments, and emails maintained on and accessible by the UE. Then block 408 states wherein the plurality of connections includes at least one of a list of contacts, social network connections, telephone calls, text messages, calendar appointments, and emails maintained on the UE. Block 410 relates to wherein the UE is unaware of a source of the description. Block 412 indicates wherein the UE does not release any portion of the plurality of connections to a source of the description prior to providing the option. Then block 414 relates to wherein the connectedness is based on an importance, job seniority, and/or relationship-strength of the connection.

The logic diagram of FIG. 4 may be considered to illustrate the operation of a method, a result of execution of computer program instructions stored in a computer-readable medium. The logic diagram of FIG. 4 may also be considered a specific manner in which components of the device are configured to cause that device to operate, whether such a device is a mobile phone, cell phone, smart phone, laptop, tablet, desktop, PC or other electronic device, or one or more components thereof. The various blocks shown in FIG. 4 may also be considered as a plurality of coupled logic circuit elements constructed to carry out the associated function(s), or specific result of strings of computer program instructions or code stored in memory.

Various embodiments of the computer-readable medium include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. Various embodiments of the processor include but are not limited to general purpose computers, special purpose computers, special purpose computers, microprocessors digital signal processors and multi-core processors.

Figure 5:
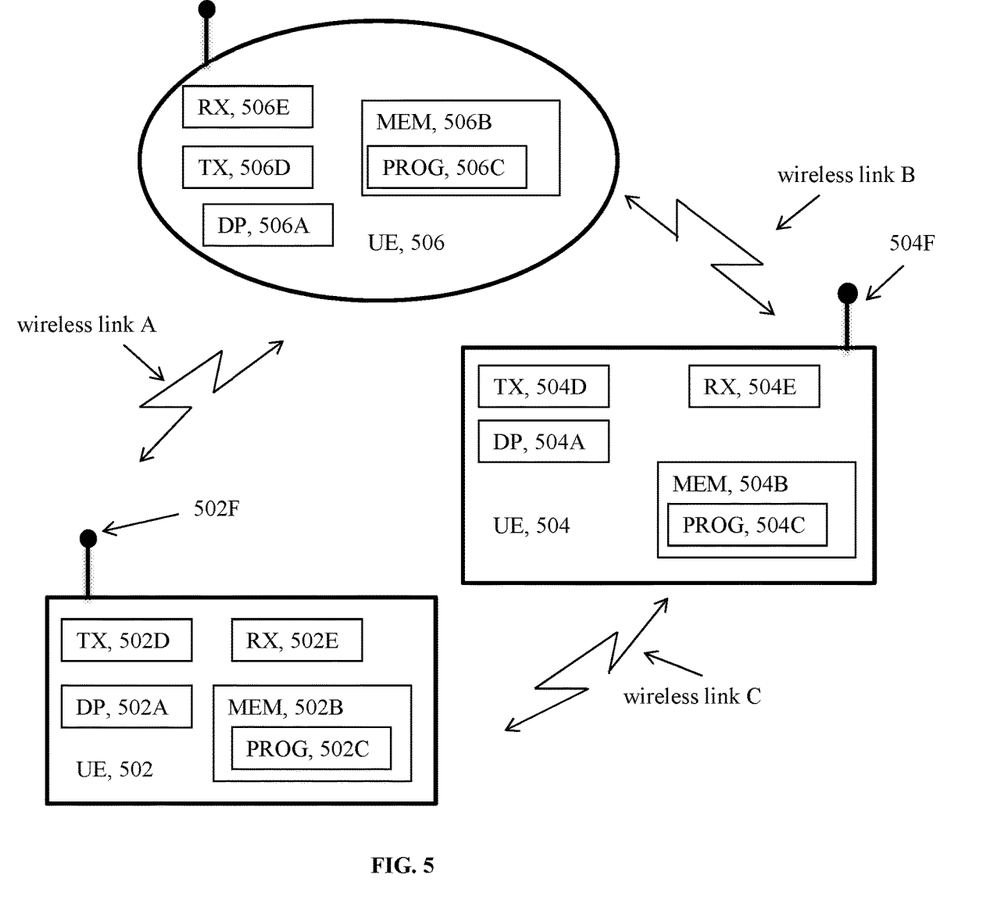
FIG. 5 presents a simplified block diagram suitable for use in practicing exemplary embodiments of this disclosure.

Referring to FIG. 5, depicted is a simplified block diagram of various electronic device and apparatus that are suitable for use in practicing exemplary embodiments of this disclosure. Shown is FIG. 5 is user equipment (UE) 506 adapted for communication over wireless link A with UE 502. UE 506 is also adapted for communication over wireless link B with UE 504. It should be appreciated that UE 502, UE 504 and UE 506 are each operable to communicate with one another via wired or wireless connections either directly or indirectly through the internet or a web server or local area server or accessible folder. UE 506 may include an electronic device such as a cell phone, computer, laptop, wearable, smart phone, server or a plurality of servers.

UE 502 includes at least one data processor (DP) 502A, storing means such as at least one computer-readable medium or computer-readable memory (MEM) 502B storing at least one computer program or application (PROG) 502C, and also communicating means such as a transmitter (TX) 502D and receiver (RX) 502E for bidirectional wireless communications with UE 506 and/or UE 504 and/or other UE's (not shown) via one or more antennas 502F as known in the art.

UE 506 includes at least one data processor (DP) 506A, storing means such as at least one computer-readable memory (MEM) 506B storing at least one computer program or application (PROG) 506C, and communicating means such as a transmitter (TX) 506D and a receiver (RX) 506E for bidirectional wireless communication with other devices as known in the art.

Likewise, UE 504 includes at least one data processor (DP) 504A, storing means such as at least one computer-readable memory (MEM) 504B storing at least one computer program (PROG) 504C, and communicating means such as a transmitter (TX) 504D and a receiver (RX) 504E for bidirectional wireless communications with other devices via one or more antennas 504F as known in the art.

Various embodiments of UE 502 and UE 504 can include, but are not limited to: cellular telephones (or mobile telephones) including smartphones, laptop computers, personal portable digital devices having wireless communication capabilities including but not limited to laptop/palmtop/tablet computers and the like.

At least one of the PROGs 502C, 504C, 506C is assumed to includes an application with program instructions that, when executed by the associated DP 502A, 504A, and 506A, enable the device to operate in accordance with embodiments of the present disclosure, as detailed herein. In these regards, embodiments of this disclosure may be implemented at least in part by computer software stored on the MEM 502B, 504B, 506B which is executable by DP 502A of UE 502, DP 504A of UE 504, and/or DP 506A of UE 506, or by hardware, or by a combination of tangibly stored software and hardware (and tangibly stored firmware). Electronic devices implementing these aspects of the disclosure need not be the entire devices as depicted at FIG. 5, but embodiments may be implemented by one or more components of same such as the above described tangibly stored software, hardware, firmware, and DP, or a system on a chip SOC, an application specific integrated circuit ASIC or a digital signal processor DSP.

In an alternative embodiment, UE 502 is operable to broadcast to multiple users of an application or PROG (including UE 504 and UE 506) of a need or description. The need or description can include the qualifications, certifications, description, knowledge base, or educational background of an individual or company the user of UE 502 is interested in meeting. The description again can include a typical human-readable online posting, but it can also include machine-readable postings, or simply a description of an ideal candidate. For instance, UE 502 can broadcast to all users of an application (rather than a select number of users) a need for a computer engineer for the business operated by the user of UE 502. It should be appreciated that the broadcasting also includes sending the need or description to a web server, file server, or local area server to which UEs 502, 504 and 506 have access and/or posting the need or description to a publically accessible location such as a website or public server. Embodiments of broadcasting further includes sending the need or description to a file server wherein the need or description is maintained in an electronic folder to which UEs 502, 504 and 506 have access. The file server while maintaining the need or description may or may not have access to the data in the need or description. In this regard, embodiments provide that UEs 504 and 506 receiving the need or description includes (1) the UEs 504 and 506 receiving the need or description directly, (2) the UEs 504 and 506 accessing a web server or local area server or smart server to which UEs 504 and 506 have access and retrieving the need or description, and (3) the UEs 504 and 506 accessing a publically accessible location such as a website or file server and again retrieving the need or description.

In this embodiment, UE 504 and UE 506 are among the plurality of UEs that receive the broadcast message from UE 502. Next, UE 504 determines whether there is a correspondence between the need or description and any of the connections maintained by UE 504 within MEM 506B or within a cloud server to which UE 504 and the application have access. If there is a correspondence between the connections on UE 504 and the need (or description) from UE 502 then UE 504 may be provided with a prompt or message notifying the user of UE 504 of the correspondence and in some embodiments, an option to message and/or notify UE 502 of the correspondence. In this embodiment, UE 506 will receive a notice or prompt indicating that UE 504 has a correspondence along with an indication that UE 506 either has or has not responded to the notice or prompt. In some instances, the user of UE 502 may either not respond or not notice the prompt indicating the correspondence. For the case that UE 504 fails to respond to the notice or prompt (including declining to contact UE 502), UE 506 is operable (through the application) to send UE 504 a second notice or prompt as a reminder to respond. It should be appreciated that embodiments of this alternative process is operable when UE 504 grants UE 506 access to UE 504's notices or prompts and/or connections.

In another instance, UE 506 may only be given the option to message or notify UE 504 of the correspondence if UE 504 fails to respond to the initial need (or description) from UE 502 within a predetermined period of time.

Figure 6:
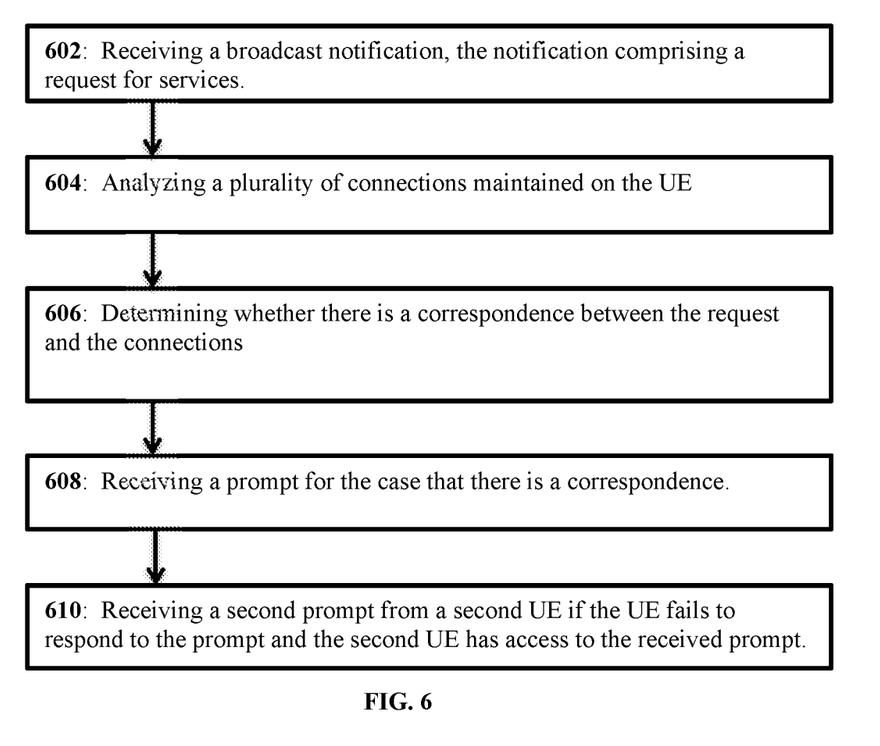
FIG. 6 presents a simplified logic flow diagram in accordance with an alternative embodiment of the present disclosure.

Reference is now made to FIG. 6, which illustrates an exemplary logic flow diagram in accordance with an alternative process suitable for performing exemplary embodiments of the present disclosure. The exemplary process begins at block 602 which indicates that a UE receives a broadcast notification, the notification comprising a request for services. It should be appreciated that the request for services includes a need or a description as previously described above. Next, at block 604 the UE or application on the UE analyzes a plurality of connections maintained on the UE. It should be appreciated that the analyzing can further include analyzing connections accessible by the UE located on a remote or cloud server. Then at block 606, determines whether there is a correspondence between the request and the connections. At block 608, the user of the UE receives a prompt for the case that there is a correspondence. Lastly, at block 610, the UE receives a second prompt from a second UE if the UE fails to respond to the prompt and the second UE has access to the received prompt. In other words, embodiments of the present disclosure allow a user, who has access to another user's prompts, to notify that other user that there is a prompt to which they have failed to respond.

This disclosure has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method of sharing, the method comprising:
receiving, by a server not publicly accessible, a description from a publisher, wherein the description is one of a job posting, an introduction request, or opportunity;
verifying that a plurality of user equipments (UEs) meet accessibility criteria;
transmitting from the server to the plurality of (UEs, the description, the UEs each having a different plurality of connection data of their respective user;
determining, by each one of the UEs, a subset of the plurality of connection data based on having a correspondence between the description and the UEs' plurality of connection data, wherein the determining comprises ranking each one of plurality of connection data based on (i) a similarity to the description, and (ii) a connectedness to the UEs' plurality of connection data;
receiving, by the server from each one of the UEs, the subset of the plurality of connection data from the UEs;
automatically determining, by the server, a subgroup of the subset of the plurality of connection data from each one of the UEs, wherein the determining comprises a second ranking of each one of the plurality of connection data;
in response to the determining the subgroup, automatically providing, by the UEs, an option to share with the publisher the subset of the plurality of connection data that are included in the subgroup of the subset of the plurality of connection data from each one of the UEs that include a correspondence above a predetermined threshold based on the second ranking; and
transmit, by the server, the subgroup of the plurality of connection data to the publisher in response to each one of the UEs responding to the option as deciding to share.

2. The method according to claim 1, wherein the server is a web server, a network share drive, a file server, a local server or a smart server.

3. The method according to claim 1, wherein the plurality of connection data is based on at least one of a list of contacts, social network connections, telephone calls, text messages, calendar appointments, and emails maintained on and accessible by the UE.

4. The method according to claim 1, wherein the UE is unaware of a source of the description.

5. The method according to claim 1, wherein the UE does not release any portion of the plurality of connection data to a source of the description prior to providing the option.

6. An apparatus comprising at least one receiver, at least one transmitter, at least one display, at least one processor and a memory storing computer program instructions executable by the at least one processor, wherein the memory with the computer program instructions and the processor are configured to cause the apparatus to at least:
verify, by the at least one processor, that accessibility criteria is met;
access, by the at least one processor, a server not publicly accessible, the server operable to maintain a description from a publisher, wherein the description is one of a job posting, an introduction request or opportunity;
receive from the server, by the at least one receiver, the description, the apparatus having a plurality of connection data;
determine, by the at least one processor, a correspondence between the description and the plurality of connection data, wherein the determining comprises ranking the plurality of connection data based on (i) a similarity to the description, and (ii) a connectedness to the plurality of connection data;
automatically transmit, to the server, the subset of the plurality of connection data having the determined correspondence;
receive, from the server, a request to share with the publisher a subgroup of the subset of the plurality of connection data, wherein the subgroup of the subset is based on a ranking of the plurality of connection data and a second plurality of connection data from a plurality of UEs;

in response to the received request, automatically provide, by the at least one display, an option to share with the publisher the subgroup of the subset of the plurality of connection data that are included in the subgroup of the subset of the plurality of connection data from each one of the UEs that include a correspondence above a predetermined threshold based on the ranking; and transmit, by the at least one transmitter, the subset of the plurality of connection data to the publisher in response to each one of the UEs responding to the option as deciding to share.

7. The apparatus according to claim 6, wherein the plurality of connection data is based on at least one of a list of contacts, social network connections, telephone calls, text messages, calendar appointments, and emails maintained on and accessible by the apparatus.

8. The apparatus according to claim 6, wherein the apparatus is unaware of a source of the description.

9. The apparatus according to claim 6, wherein the apparatus does not release any portion of the plurality of connection data to a source of the description prior to providing the option.

10. A non-transitory computer-readable medium tangibly storing computer program instructions which when executed by a processor of an apparatus comprising at least one receiver, at least one transmitter, and at least one display, cause the apparatus to at least:

verify, by the processor, that accessibility criteria is met;

access, by the processor, a server not publicly accessible, the server operable to maintain a description from a publisher, wherein the description is one of a job posting, an introduction request or opportunity;

receive from the server, by the at least one receiver, the description, the apparatus having a plurality of connection data;

determine, by the at least one processor, a subset of the plurality of connection data based on having a correspondence between the description and the plurality of connection data, wherein the determining comprises ranking the plurality of connection data based on (i) a similarity to the description, and (ii) a connectedness to the plurality of connection data;

automatically transmit, to the server, a subset of the plurality of connection data having the determined correspondence;

receive, from the server, a request to share with the publisher a subgroup of the subset of the plurality of connection data, wherein the subgroup of the subset is based on a ranking of the plurality of connection data and a second plurality of connection data from a plurality of UEs;

in response to the received request, automatically provide, by the at least one display, an option to share with the publisher the subgroup of the subset of the plurality of connection data that are included in the subgroup of the subset of the plurality of connection data from each one of the UEs that include a correspondence above a predetermined threshold based on the ranking; and (g) transmit, by the at least one transmitter, the subset of the plurality of connection data to the publisher in response to each one of the UEs responding to the option as deciding to share.

11. The non-transitory computer-readable medium according to claim 10, wherein the plurality of connection data is based on at least one of a list of contacts, social network connections, telephone calls, text messages, calendar appointments, and emails maintained on and accessible by the processor.

12. The non-transitory computer-readable medium according to claim 10, wherein the apparatus is unaware of a source of the description.

13. The non-transitory computer-readable medium according to claim 10, wherein the apparatus does not release any portion of the plurality of connection data to a source of the description prior to providing the option.

* * * * *